United States Patent [19]
Ryc

[11] 3,779,016
[45] Dec. 18, 1973

[54] APPARATUS FOR CONTROL OF HYDRAULIC CIRCUITS

[75] Inventor: Oldrich Ryc, Pribor, Czechoslovakia

[73] Assignee: TAIRA, narodni podnik, Koprivince, Czechoslovakia

[22] Filed: Apr. 17, 1972

[21] Appl. No.: 244,662

[52] U.S. Cl..................... 60/329, 60/420, 60/445, 60/488
[51] Int. Cl........................................... F15b 11/16
[58] Field of Search................... 60/329, 420, 444, 60/445, 463, 488, 430

[56] References Cited
UNITED STATES PATENTS
3,543,508  12/1970  Schwab.......................... 60/445 X
3,672,166  6/1972   Isaac............................... 60/420 X Primary Examiner—Edgar W. Geoghegan
Attorney—Murray Schaffer et al.

[57] ABSTRACT

A system for controlling a pair of hydraulic motor circuits, comprising a source of primary fluid, first conduit means including a valve having hydraulically actuable bypass means for delivering primary fluid to one or both of the said motor circuits. A hydraulic adjustable pump is interposed between the source of primary fluid and the valve. A secondary fluid system including second conduit means having a thermo valve is provided. The thermo valve is responsive to a predetermined level of heat generated by the operation of the motors to cause delivery of the secondary fluid simultaneously to the adjustment means and the bypass means.

10 Claims, 3 Drawing Figures

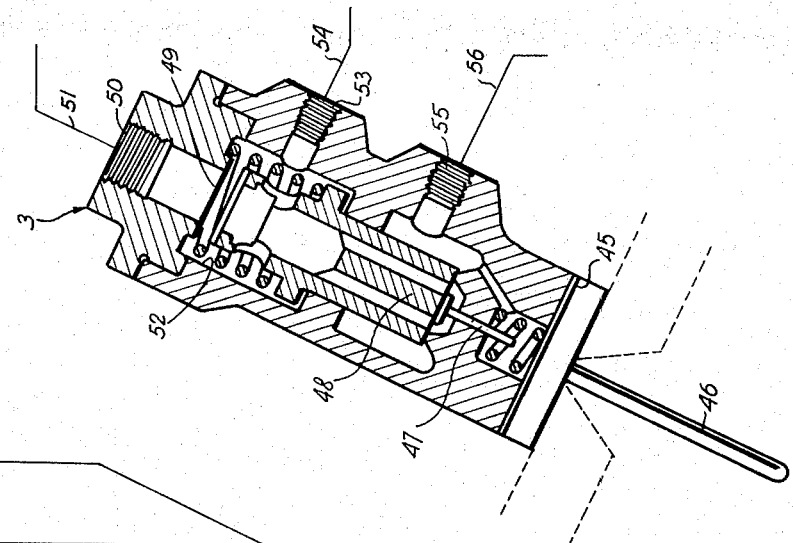
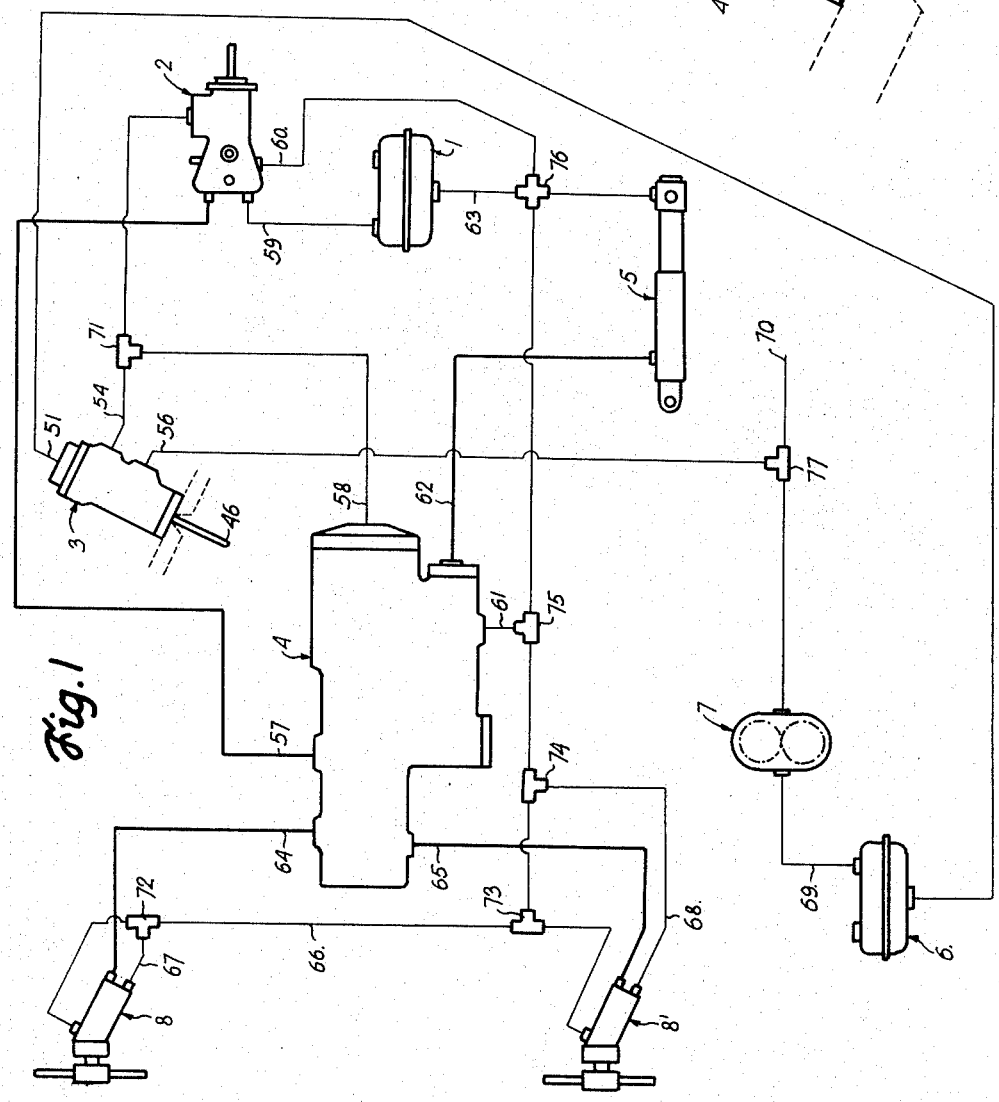

3,779,016

APPARATUS FOR CONTROL OF HYDRAULIC CIRCUITS

BACKGROUND OF INVENTION

The present invention relates to a system of control of the operation of a pair of hydraulic motor circuits and particularly, to a system for jointly controlling the operation of hydraulic power steering devices and the hydraulic cooling devices of motor vehicles.

Generally, power steering and cooling systems are hydraulically operated and employ rotary hydraulic motors controlled by linear piston and cylinder hydro-engines. When circuit systems for two or more motor units are employed certain operational difficulties arise. For example, when the motion of rotating motors is initiated or stopped a pressurized liquid is delivered to the pistons of the controlling hydro-engines to induce shaft rotation. During the stopping of a rotating motor the input pressure of the hydraulic motor is decreased while the pressure on the output of the hydro-engine is increased. This occurs because the motor changes its function to that of a pump which is driven by the rotating mass of its rotor.

Commonly, the hydraulic circuit is provided with a distribution valve by which the hydro-engines are alternately connected or disconnected to the pressure pump of the fluid media. When an abrupt or quick connection is effected, the hydro-engine must produce a great torque in order to set the mass of the rotor turning at the desired speed within a short period of time. Thus, a pressure impact is induced at the output branch of the circuit. Similarly, when the pump is abruptly disconnected, the inertia of the rotor mass develops a great torsional moment which causes an impact on the output branch of the circuit. The magnitude of the impact is limited, only as presently known, by the use of safety valves and accumulators or reservoir storage tanks connected to both branches of the circuit. The safety valves limit only the pressure peaks, whereas the accumulators or storage reservoirs dampen both the starting and stopping movements.

Accumulators are designed either as a cylinder provided with a spring loaded piston or as a vessel with a liquid and/or a gas cushion. In the case of an abrupt connection of the hydraulic engine with the pump, a part of the liquid from the input branch passes to the accumulator so that the pressure impact is relieved. In the case of an abrupt disconnection of the running hydraulic motor, the accumulator on the output branch will be filled with the gradually increasing pressure. At the same time the increasing pressure creates a brake effect on the decreasingly running hydraulic motor. Because the accumulators form an elastic system, it creates a vibration of the shaft of the hydraulic motor. To avoid this the accumulators are interconnected to the output branch of the interposed hydraulic engine through return valves and through throttling mechanisms so that a free input of the liquid to the accumulator is permitted although, the return flow liquid is prevented.

A disadvantage of these devices exists in that the accumulator must be filled by a pressurized gas complicating its manipulation. The accumulator, as a pressure vessel, filled by compressed gas requires the observance of special safety precautions. In accumulators a spring loaded piston spring must be dimensioned for a strength which corresponds to the full working pressure in the hydraulic circuit. Thus, the spring results in great dimensions and the device is bulky. Also the sealing means for the piston is stressed during its movement by the full liquid pressure.

The hydraulic engines used for the rotary motors are designed so that the axial acceleration of the radially arranged pistons is greater than the centrifugal acceleration so that they have a low pressure suction filling or intake. The accumulators connected to both branches of a hydraulic engine through the return valves and the throttling mechanism do not fulfill this function sufficiently because the throttling mechanism of the accumulator on the intake branch of the hydraulic engine prevents a quick discharge of the liquid. If the resistance of the throttling mechanism is decreased, there is increased the elasticity of the system and the tendency to vibrate.

A further disadvantage of damping devices with accumulators consists in that following the stopping of the hydraulic engine by means of the back pressure from the storage in the waste branch, a gradual balance of both pressures in both accumulators, sets in across the throttling mechanism. This causes a swing of the rotating part from the position where the same is stopped.

SUMMARY OF INVENTION

According to the present invention these disadvantages are overcome by the use of an arrangement whereby in the hydraulic control circuit of the hydraulic motor at least one cylinder with a piston is introduced and the space in front of the piston is connected with the hydraulic circuit of the hydraulic motor. The space behind the piston is connected through the throttling mechanism and through the back or return valve with the outer space. The flow resistance of the liquid through the throttling mechanism from the space behind the piston has, in this manner, a course that depends on the position of the piston in the cylinder.

Most commonly used vehicles are provided with power steering which requires the use of a pump, generally, situated directly on the motor. This permits a solution of the problem by using one pump of sufficient dimension for both fluid consumers; for example, the hydro-engines of fan drive and of the power steering mechanism. The present invention, is therefore, economical and advantageous also, because at the time when the fans are out of operation, the amount of the oil delivered by the pump will be smaller, and this according the demands of the power steering.

It is preferable and advantageous to use an adjustable pump for the fulfillment of this condition because it guarantees a good control of the quantity of flow. If a non-adjustable pump were used to supply the total maximum quantity which corresponds with the needs of both the engine consumers, the pump would operate at the rate for the minimum and maximum delivery, affected only by the number of turns of the engine. This would circulate a greater amount of fluid than is generally needed. Much of the power would be wasted, as for example, during the time when the cooling fans are out of operation. The circulation, through the distribution valve and the conduits, would form a source of undesirable heat, substantially influencing the operation of the device and more frequent cooling of the hydro-engines would be necessary. This reduces the service life of the apparatus. At the same time, the pump would permanently extract more power output than is needed for the power steering which would tend to create excessive wear and tear on the steering devices.

It is preferable therefore, to use an adjustable pump as affords only such a power output which is needed for the use of the given hydro-engines. This can be achieved by the use of suitable control valves, a thermal sensing element and similar controls which will react to the instantaneous conditions of the engine operation. According to the present invention, the control of this pump is performed through a secondary hydraulic circuit.

According to the present invention, the primary hydraulic circuit is interconnected by a thermo-valve controlled by a thermo-sensing element responsive to the temperature of a given warming or heated point of the motor, for example of the cylinder head. The thermo valve controls a pressure medium delivered by a second pump from a reservoir tank and feeds the same, partly to a primary pump, to perform its adjusting operation. The primary pump is thus controlled to deliver a small amount of hydraulic fluid to satisfy one motor (i.e., for the drive of the power steering) or to deliver a maximum flow of the pressure medium to satisfy both motors (i.e., simultaneously drive the hydro-engine of the fan and the power steering). The thermo valve similarly delivers a part of its fluid to a bypassing element for the control of a sleeve valve which controls the delivery of the pressure medium from the primary pump to the hydro-engines and which controls the amount of the delivered pressure medium. a second cylindrical cavity in which is situated a second sleeve is furnished on its surface with circumferential slots, and has an inner cavity, connected by a channel passage with a medium wider slot. The cavity is closed by a threaded end of a piston rod, connected with a piston, which is shiftably arranged in a stepped part of a cylindrical cavity having a wider diameter. Below the cylindrical cavity of the sleeve valve there is formed a second cylindrical cavity in which is situated a second sleeve valve, where at the same time the cavity is interconnected through channel passages with the cavity of the first sleeve valve and at the same time through a channel with a cavity for an excess pressure safety valve. At the same time the cavity is interconnected through a channel with the ring slot of the sleeve valve and through a channel with a cylindrical cavity of the sleeve valve.

An advantage of the present invention consists in the increase of the torsional moment of both hydro-engines at maximum pressure.

A further advantage arises from the smaller dimensions necessary for the hydro-engines. This enables the production of a greater number of turns and of smaller inertial and centrifugal forces.

A further advantage is the greater control of the pump and an economical power consumption, as well as the relief of the pressure branch of the piping and a diminution of the fluid losses.

BRIEF DESCRIPTION OF DRAWINGS

The system according to the present invention is shown on the accompanying drawings where FIG. 1 shows, schematically the circuit diagram, FIG. 3 shows an axial section through the thermal sensing valve element.

DESCRIPTION OF INVENTION

Figure 2:
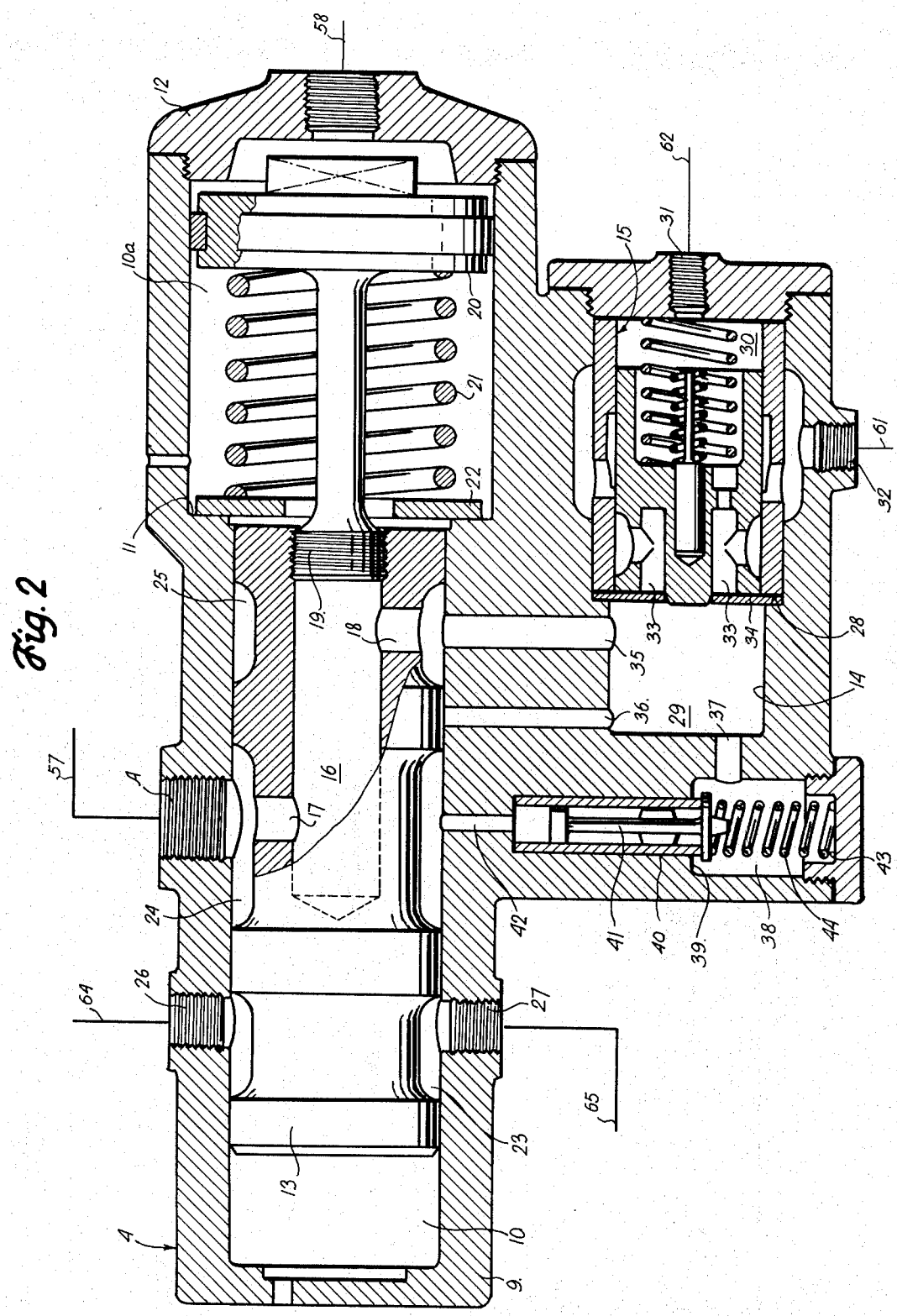
FIG. 2 shows an axial section through the bypassing element.

The hydraulic system of the present invention comprises a fluid reservoir 1, a primary pump 2, a thermo or heat responsive valve 3, a bypass distributor valve assembly 4, a power steering control actuator 5 (hydro-engine), a secondary reservoir 6, a secondary pump 7 and a pair of hydro-engines 8 and 8'.

The primary reservoir 1 and pump 2 are linked in a hydraulic system through the bypass valve assembly to functionally control the operation of the power steering control element 5 and the hydro-engines. A primary hydraulic fluid such as oil flows through this circuit. The power steering element 5 is conventional in nature and generally, comprises a pressure cylinder and piston actuator. The hydro-engines may be similar devices but are preferably rotatable mechanisms designed to provide rotary movement. In a particular set-up of this system on a vehicle the hydro-engines 8 and 8' may be used to power cooling fans for radiator, or similar vehicle systems.

The reservoir 1 is a storage tank. The pump 2 is any suitable pump with flow regulating means. Preferably, the pump is a rotary fluid pump with speed control means for its rotor capable of being positioned at at least high and low flow rates. In accordance with the invention it is preferable that this flow control means be hydraulically actuated and therefore a piston cylinder arrangement for regulating the rotor is preferred.

The secondary reservoir 6, pump 7 and thermo responsive valve 3 are arranged in a second circuit through which an independent fluid media flows. This medium is used to control the speed of the pump 2 and the actuation of the bypass valve 4 so to functionally control either or both the power steering element 5 or the hydro-engines 8 or 8'.

In bypass valve assembly 4 is seen in detail in FIG. 2. It comprises a body 9 closed at its left end. The body 9 defines an inner cavity or chamber 10 which has an enlarged portion 10a at its right end separated by a shoulder 11 from the smaller portion at its left end. A removable cover 12 caps the right end. A reciprocal sleeve valve 13 is located within the cavity 10. A fluid inlet A is arranged to communicate with the left hand portion. Beneath the cavity 10, the body 9 is further formed with a second horizontal, but shorter cavity 14. A second reciprocal sleeve valve 15 is located in cavity 14. The sleeve valve 13 is substantially hollow and cylindrical, closed at one end to define an internal bore 16 from which lead radial passage channels 17 and 18 axially offset from each other at diametrically radial offset positions. A rod 19 is fixed to the inner surface of the bore 16 and extends axially outward into the enlarged right end of the cavity 10. A piston head 20 is fixed to the end of the rod 19 and is biased by a spring 21 located between it and a plate washer 22 resting on the shoulder 11. The piston 20 is, of course, reciprocal in the larger cavity portion and when moved will reciprocate the sleeve valve 13.

The sleeve valve 13 is provided on its outer surface with the circumferential ring slots 23, 24 and 25. The slot 24 is the axially longest or broadest one of the ring slots and is arranged over the radial channel 17. The right most ring slot 25 is smaller and it is arranged to lie over the radial channel 18. The third ring slot 23 is axially offset to the left and is positioned to lie opposite a pair of opposed outlet bores 26 and 27 formed in the body 9. For a purpose more fully described later, the central ring slot 24 is sufficiently broad (axial length) to be able to span the distance between inlet A and the outlet 26 when the sleeve valve 13 is pushed to the left, but to assume the positions shown in FIG. 2 when in normal right hand position.

The lower horizontal cavity 14 is also provided with a shoulder 28 which divides this cavity into two parts. The left chamber 29 is of smaller diameter while the right chamber 30 is of larger diameter. The valve 15 is situated in the right or larger chamber 30 and is formed of a fixed diaphragm 34 which rests on the shoulder 28 under action of a pair of springs. The larger chamber 30 is provided with a pressure outlet 31 and a waste or overflow outlet 32. The valve 15 is provided with a plurality of horizontal channels 33, 33 through which the fluid flows in a tortuous and restricted path in communication with outlet 31 and the smaller chamber 29. Radially extending from chamber 29 upward toward the cavity 10 are a pair of axially spaced passages 36 and 36, which through channel passages 17 and 18 communicate with the ring slot 24.

A horizontal passage 37 connects cavity 14 with a vertical cavity 38 depending below the ring slot 24 to which it is connected by a passage 42. The cavity 38 is also divided by a step 39 and in the upper part of the cavity is situated a sleeve 40 in which a poppet valve member 41 reciprocates. The sleeve 40 forms a seat for the valve head which is normally biased in closed position by a spring 44 supported in a recess 43. The valve 41 is unseated by any fluid in the ring slot 24 of a greater pressure than spring 44. Such excess pressure could occur because of a blockage in the channels 17 and 18, cavity 14 and the valve 15. This valve 41 acts as a safety relief valve.

The thermo valve 3, as seen in FIG. 3 includes a housing defining an interior bore closed at one end by a removable cap and provided with a flexible diaphragm 45 recessed from its other end. This end is closed and provided with a heat expandable liquid in contact with a heat responsive sensor element 46. The thermo valve is adapted to be mounted in conjunction with a heat producing area of the vehicle, engine or other device so that the sensor 46 senses changes in heat therein and transmits the same to the liquid which expands to flex the diaphragm. A tappet 47 is arranged within a hollowed piston valve 48 located within the bore of the housing. The tappet moves upwardly or downwardly in response to the diaphragm to open or close a mouth 49 to an outlet 50 leading to a waste conduit 51. The waste conduit 51 (as seen in FIG. 1) leads to the reservoir tank 6. The bore of thermo valve is also provided with an enlarged chamber 52 which is connected by an outlet opening 53 and a conduit 54, through a T fitting 71 with the control of the primary pump 2. The thermo valve 3 has an inlet 55 which is connected by means of a conduit 56 to the secondary pump 7 through a second T fitting 77 (FIG. 1). The pump 7 normally provides pressurized fluid which, in the absence of the tappet 47, closing the mouth 49, passes through the valve 3 from inlet 55 to waste outlet 50. The piston valve 48 is provided with a biasing spring and a shoulder normally resting on an internal circumferential step in the bore of the housing. Radial holes are provided adjacent the level of the outlet 53 so that fluid passage is provided between the inlet 55 and the outlet 53 via the hollowed piston valve 48 and radial holes.

The thermo valve 3, as will be later described, is employed to control the operation of the primary pump 2, via passage of a liquid media through conduit 54. The pump 2 is provided with a speed control mechanism such as a hydraulic spring loaded cylinder designed to place its pressure actuator or rotor alternately into a first minimum or second maximum flow or pumping condition. The operation of this speed control function of the pump 2 may therefore be dependent on the thermo valve producing within the conduit 54 pulsed or pressured fluid flow responsive to the sensing element 46.

The operation of the hydro-engines 8 and 8' and of the power steering control assembly 5 can be accomplished simultaneously or separately. Manually it may be accomplished by presetting the primary pump control mechanism to either the first or second position, or to permit such setting automatically via the thermo valve 3. In the event separate power steering is desired or the need for the hydro-engines does not exist, hydraulic fluid such as oil is sucked from the reservoir 1 by the primary pump 2 through the conduit 59. Initially the control cylinder of the pump 2 is set in the starting position to permit the rotor to deliver only a small quantity of hydraulic fluid or oil. The fluid then flows from the pump 2 via conduit 57 into the bypass valve assembly 4, about the circumferential slot 24. From slot 24 it flows through channel 17 into the cavity 16 and channels 18 and 35 until it reaches the horizontal chamber 14. From chamber 14 it flows across the sleeve valve 15 into the right chamber 30 where it exits from outlet 31 through conduit 62 into the operating cylinder of the power steering control element 5. From the element 5, the hydraulic fluid exhausts through conduit 60, a cross-connection 76 and conduit 63 back to the reservoir 1.

By means of this closed hydraulic circuit the pump 2 need exert only a small power output and need cause only a small quantity fluid flow. Losses in fluid, pressure and power are thus decreased and held to a minimum, while simultaneously the branch systems of the hydro-engines 8 and 8' are fully relieved of any operational function.

The sleeve valve 15 of the valve assembly 14 is arranged under spring loading so that during any increase in pressure above a predetermined admissible limit, such as for example, as might result from momentary or other increased delivery from pump 2, the fluid in the cavity 14 is relieved. The high pressure fluid in cavity 14 pushes on the diaphragm plate 34 which slides the entire valve 15 aside, to the right, bypassing the seat 28 to flow to the waste conduit 61, through outlet 32. The conduit 61 carries the fluid across the distributor fittings 75 and 76 back to tank 1. Should the safety relief valve 41 also open the fluid would pass into cavity 14 through the passage 37 and act on the valve 15 in the same manner as above.

In the event control of both the power steering and of the hydro-engines 8, 8' is necessary because of the heat in the vehicle etc., the thermo responsive valve 3 senses a rise in temperature at the scanned point. (The sensor 46 may, for example be located to sense temperature in a motor cylinder head, or other heat producing device.) The sensor 46 causes the liquid arranged between it and the diaphragm 45 to increase in volume effecting the movement of the diaphragm 45. The increasing volume causes the diaphragm in turn to move the tappet 47 upwardly allowing the secondary pump 7 to deliver pressurized medium from tank 6 through the distributor fitting 77 and conduit 56 into the thermo valve 3. The pressurized medium flows around the tappet 47, through the hollow piston valve 48 (raising it also) outwardly of the holes, therein, out of the outlet opening 53 into the conduit 54 to set the control mechanism of the primary pump 2 into the second (full or maximum) pump condition. The pump 2 thus delivers fluid at higher flow and pressure conditions sufficient to operate the power steering control element 5 and both hydro-engines 8 and 8' so that the attached cooling fans may function. The hydro-engines 8 and 8' are actuated via the flow of fluid medium out of outlet 53 into conduit 54. The T distributor 71 separates this flow of media dividing a portion of it into the conduit 58 which is connected to the cap 12 of the valve assembly 4 above the piston 20. The flow of pressurized media through conduit 58 causes the piston 20 to move the sleeve valve 13, against the bias of spring 21, to the extreme left position. By this action, the broad ring slot 24 interconnects both passage holes 26 and 27 with the inlet conduit 57 from the primary pump 2 and at the same time permits the circumferential slot 25 to cover the second channel 36 into the chamber cavity 14 so that the hydraulic fluid would flow via the outlet 31 and conduit 62 to the power steering control element 5. The breadth of the circumferential slot 25 is such that when the sleeve 13 is in left hand position the channel passage 35 is blocked, at least in part, by the sleeve 13 to prevent excess fluid from entering the chamber cavity 14.

During the period that the hollowed piston valve 48 is elevated by the pressurized medium entering the inlet 55 it seats against the mouth 49, preventing leakage into waste outlet conduit 51 of any of the pressurized medium about the tappet 47. The hydraulic fluid flowing to the hydro-engines 8 and 8' is returned through conduit 66 across the distributor fittings 72, 73, 74, 75 and 76 to the storage reservoir 1.

Once the vehicle engine etc., is cooled to an admissible level and the sensor 46 cools, the volume of fluid on the diaphragm 45 diminishes and the tappet 47 falls. The pressurized media, then, flows outwardly of the waste conduit 51 permitting the spring loaded piston valve 48 to resume its original position. At the same time, because of the loss of pressure in conduit 58, the sleeve valve 13 shifts to the right under action of its spring 21. Any residual media is forced back via conduit 54 to reservoir 6. The speed control mechanism in the pump 2 which is also spring loaded also acts to return the residual medium via conduit 54 into the tank 6.

From the above it will be apparent that the objects set forth earlier are all met. The present invention is intended to be illustrative only and should not be taken as limiting in any way.

What is claimed:

1. A system for controlling a pair of hydraulic motor circuits, comprising a source of primary fluid, first conduit means including a valve having hydraulically actuable bypass means delivering primary fluid selectively to one or both said motor circuits, a first pump interposed between said source of primary fluid and said valve, said first pump having hydraulically operable adjustment means for varying the flow of primary fluid therethrough, a source of secondary fluid, second conduit means including a thermo valve, said thermo valve being responsive to a predetermined level of heat generated by the operation of said motors to cause delivery of said secondary fluid simultaneously to said adjustment means and said bypass means to actuate the same to control flow of primary fluid simultaneously to each of said adjustment means and bypass means.

2. The system according to claim 1 wherein said first pump is adjustable to deliver an amount of primary fluid at a given pressure to operate one of said circuits and an amount of primary fluid at a higher pressure to operate both of said circuits.

3. The system according to claim 2 including a second pump interposed between the source of secondary fluid and said thermo valve to supply said secondary fluid thereto under pressure.

4. The system according to claim 1 wherein said valve comprises a body having a central bore defining a first and second chamber, a sleeve having an inner cavity reciprocable within said first chamber, said body and said sleeve having a plurality of passages forming inlets and outlets for selective flow of primary fluid therethrough, a piston connected to said sleeve and extending into said second chamber means for biasing said piston in one direction within said second chamber, said second conduit means including a connection to said second chamber for feeding secondary fluid thereto on response of said thermo valve to thereby move said piston and said sleeve into selected positions.

5. The system according to claim 1 wherein said sleeve forms a sliding fit within the bore of said body, said sleeve being formed with a first and second circumferential ring slot spaced from each other and radial passages aligned with each, said body being formed with an inlet for primary fluid and a first and second outlet to each of the motor circuits respectively, said sleeve being movable between a first position permitting flow of fluid from said inlet into said first slot, through said sleeve, said second slot and out said first outlet to deliver primary fluid to one motor circuit and a second position permitting flow of fluid from said inlet simultaneously to the first and second outlet to deliver primary fluid to both motor circuits.

6. The system according to claim 5 wherein said first slot is of sufficient breadth to bridge said first slot and said second outlet when said sleeve is in the second position.

7. The system according to claim 6 wherein said second outlet comprises a pair of spaced holes each leading to a portion of the associated motor circuit and said sleeve is formed with a third circumferential ring slot aligned with said holes when said sleeve is in the first position to permit circulation of fluid between said portions of the motor circuit.

8. The system according to claim 1 including means for relieving the pressure within said valve.

9. The system according to claim 5 including means for relieving the pressure within said valve comprising a second bore formed within said body, a conduit connecting said second bore with the first outlet, a second sleeve located within said second bore, said sleeve having passage means for permitting a predetermined flow of fluid therethrough, an outlet from said second bore to the associated motor circuit, and a waste outlet from said second bore, said sleeve having biasing means within said bore to normally close said waste outlet, said biasing means being overcome on application of a flow of pressurized fluid of greater than a predetermined value.

10. The system according to claim 9 including conduit means leading from said first ring slot directly to said second bore to bypass the first outlet of said body.

* * * * *